G. W. STOUFFER.
Spoke Tenon.
No. 80,678.
Patented Aug. 4, 1868.
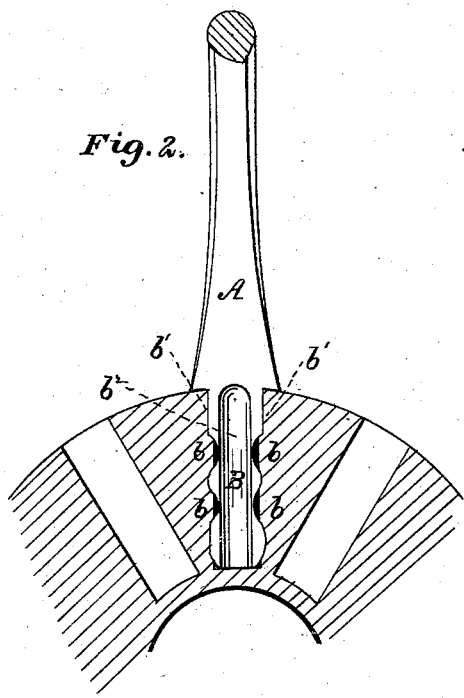
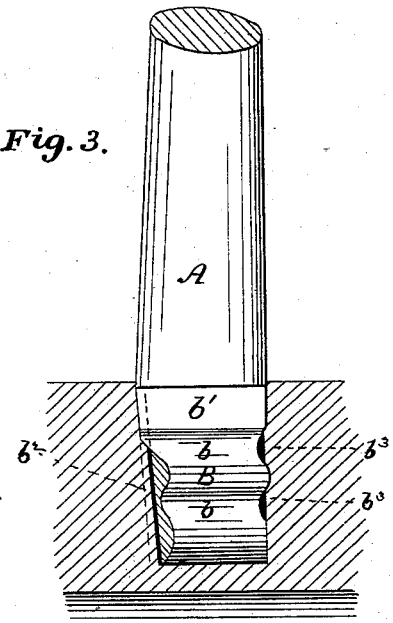
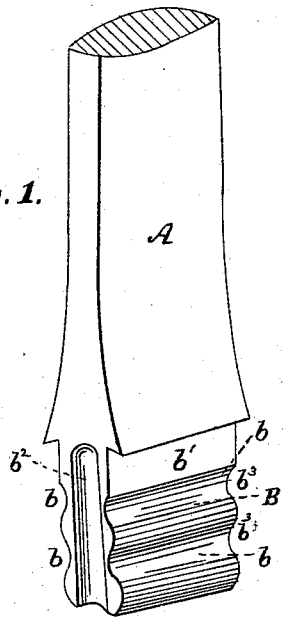
Witnesses:
Inventor:

United States Patent Office.

GEORGE W. STOUFFER, OF LEWISTOWN, PENNSYLVANIA.

Letters Patent No. 80,678, dated August 4, 1868.

IMPROVEMENT IN SPOKE-TENONS.

The Schedule referred to in these Letters Patent and making part of the same.

TO ALL WHOM IT MAY CONCERN:

Be it known that I, GEORGE W. STOUFFER, of Lewistown, in the county of Mifflin, and State of Pennsylvania, have invented a new and useful Improvement in Spoke-Tenons; and I do hereby declare the following to be a full, clear, and exact description thereof, reference being had to the accompanying drawing, which is made a part of this specification.

My improvement consists in forming the tenon of a spoke with concavities or grooves in some or all of its sides, said concavities or grooves serving to facilitate driving the spoke, as the frictional surface is greatly reduced; to preserve the dish, or to preserve the straightness of the wheel when no dish is desired; and also, when the spoke is driven with white lead or glue, to retain said substance in its grooves, and thus, by distributing it as desired, increase its effectiveness, the common forms of tenons always driving the major part of the substance either out of or to the bottom of the mortise.

In the drawing—

Figure 1 is a perspective view of a portion of a spoke provided with my improved tenon.

Figure 2 is an edge view of the same in position in the hub, a segment of which is shown in red lines in transverse section.

Figure 3 is a side view and longitudinal section of the respective parts represented in fig. 2, a corner of the tenon being broken away, to more fully represent its construction.

A may represent the body of the spoke, and B the tenon. The sides of the latter I provide with transverse grooves, $b$, preferably so arranged as to give the sides of the tenon, or at least the lower end of the same, an undulating surface, the surface of the upper end, $b^1$, being preferably left plane. The back of the form of tenon represented has a longitudinal groove, $b^2$, which is found to best preserve the dish of the spoke, the edge or side not thus provided having grooves, $b^3$, corresponding with the ones $b$. When the tenon is straight, a groove similar to $b^2$ is also provided in its front edge, so as to support it equally in both directions.

I propose using my improvement in any of the different forms of driven tenons adapted for its reception, and regulating the number and position of the grooves, as may be found best adapted for the form of tenon in which used.

It is also obvious that in the form of tenon represented, some of the grooves may, when preferred, be dispensed with, or the number of them increased, without departing from the invention.

Having thus described my invention, I claim as new therein, and desire to secure by Letters Patent—

The provision in a spoke-tenon of the grooves or concavities $b$, $b^2$, $b^3$, employed and operating as described for the purposes specified.

To the above specification of my improvement in spoke-tenons, I have signed my hand, this 22d day of June, 1868.

G. W. STOUFFER.

Witnesses:
 Jos. S. WARCAM,
 W. H. BRATTON.